(12) United States Patent
Kang et al.

(10) Patent No.: US 10,061,160 B2
(45) Date of Patent: *Aug. 28, 2018

(54) PHOTOALIGNMENT AGENT, PHOTOALIGNMENT LAYER, LIQUID CRYSTAL DISPLAY DEVICE, AND METHOD OF MANUFACTURING THE SAME

(71) Applicant: Samsung Display Co., Ltd., Yongin (KR)

(72) Inventors: Suk Hoon Kang, Seoul (KR); Jun Woo Lee, Seongnam-si (KR); Jin-Soo Jung, Hwaseong-si (KR); Baek Kyun Jeon, Yongin-si (KR); Jong Hwan Jeon, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 70 days.

This patent is subject to a terminal disclaimer.

(21) Appl. No.: 14/740,773

(22) Filed: Jun. 16, 2015

(65) Prior Publication Data

US 2016/0070142 A1    Mar. 10, 2016

(30) Foreign Application Priority Data

Sep. 4, 2014 (KR) .................. 10-2014-0117938

(51) Int. Cl.
*C09K 19/56* (2006.01)
*G02F 1/1337* (2006.01)
(Continued)

(52) U.S. Cl.
CPC ....... *G02F 1/133723* (2013.01); *C08G 73/10* (2013.01); *C08L 77/00* (2013.01);
(Continued)

(58) Field of Classification Search
CPC ............ C02F 1/133723; C02F 1/13378; C02F 1/133788; C02F 1/133711;
(Continued)

(56) References Cited

U.S. PATENT DOCUMENTS

| | | | |
|---|---|---|---|
| 6,063,829 A | 5/2000 | Endou et al. | |
| 2007/0071913 A1 | 3/2007 | Fujii et al. | |

(Continued)

FOREIGN PATENT DOCUMENTS

| | | | |
|---|---|---|---|
| JP | 2005275360 A | * | 10/2005 |
| JP | 2008/033257 | | 2/2008 |

(Continued)

OTHER PUBLICATIONS

Double Pond Chemical-Bonding Partnership, "CHICURE 800, Cross-linking agents for polyester powder coatings", Jan. 2004, New Taipei City, Taiwan.

(Continued)

*Primary Examiner* — Ruiyun Zhang
(74) *Attorney, Agent, or Firm* — H.C. Park & Associates, PLC

(57) ABSTRACT

A liquid crystal display device is provided. An exemplary embodiment of the present invention provides a liquid crystal display device including: a first substrate; a thin film transistor disposed on the first substrate; a first electrode connected to the thin film transistor; and a first alignment layer disposed on the first electrode. The first alignment layer includes: a copolymer formed from at least one compound of cyclobutane dianhydride (CBDA) and a cyclobutane dianhydride derivative, and a first diaminean including alkylene group ($-C_kH_{2k-}$, k being a natural number); and a cross-linking agent including an alkylene group ($-C_nH_{2n-}$, n being a natural number), wherein the copolymer includes polyimide.

16 Claims, 9 Drawing Sheets

(51) Int. Cl.
*C08G 73/10* (2006.01)
*C08L 77/00* (2006.01)
*G02F 1/1333* (2006.01)
*G02F 1/1343* (2006.01)
*G02F 1/1362* (2006.01)
*G02F 1/1368* (2006.01)

(52) U.S. Cl.
CPC ............ *C09K 19/56* (2013.01); *G02F 1/1368* (2013.01); *G02F 1/133345* (2013.01); *G02F 1/133788* (2013.01); *G02F 1/134309* (2013.01); *G02F 1/136227* (2013.01); *G02F 1/133711* (2013.01); *G02F 2001/133397* (2013.01); *Y10T 428/10* (2015.01); *Y10T 428/1005* (2015.01); *Y10T 428/1018* (2015.01)

(58) Field of Classification Search
CPC ............ C02F 1/134309; Y10T 428/10; Y10T 428/1018; Y10T 428/1023; Y10T 428/1005; C09K 19/56; C08G 73/10; C08G 73/1007; C08G 73/1046; C08G 73/1064; C09D 179/08
USPC ........ 428/1.1, 1.2, 1.25, 1.26; 349/123, 130, 349/132; 524/600, 602; 525/436; 528/310, 350, 353
See application file for complete search history.

(56) References Cited

U.S. PATENT DOCUMENTS

| | | |
|---|---|---|
| 2010/0243955 A1 | 9/2010 | Tsai et al. |
| 2010/0272979 A1 | 10/2010 | Marck et al. |
| 2012/0196054 A1 * | 8/2012 | Lee .................. G02F 1/133788 428/1.26 |
| 2012/0295199 A1 | 11/2012 | Takeyama et al. |
| 2014/0072730 A1 | 3/2014 | Hwang et al. |

FOREIGN PATENT DOCUMENTS

| | | | |
|---|---|---|---|
| JP | 2008-116809 | 5/2008 | |
| JP | 2012-093642 | 5/2012 | |
| KR | 10-2010-0043020 | 4/2010 | |
| KR | 10-2010-0085068 | 7/2010 | |
| KR | 10-2011-0037839 | 4/2011 | |
| KR | 10-2011-0072173 | 6/2011 | |
| KR | 10-2011-0109840 | 10/2011 | |
| WO | 2008/153287 | 12/2008 | |
| WO | 2012/176822 | 12/2012 | |
| WO | 2013/094734 | 6/2013 | |
| WO | WO 2015072554 A1 * | 5/2015 | ....... G02F 1/133723 |

OTHER PUBLICATIONS

Schmaljohann, et al., "Modification with alkyl chains and the influence on thermal and mechanical properties of aromatic hyperbranched polyesters", Macromolecular Chemistry and Physics, 2000, pp. 49-57, vol. 201, No. 1, Germany.
The Extended European Search Report dated Jan. 18, 2016, in European Patent Application No. 15183564.2.
Non-Final Office Action dated May 11, 2016 in U.S. Appl. No. 14/723,672.
Final Office Action dated Sep. 1, 2016 in U.S. Appl. No. 14/723,672.
Non-Final Office Action dated Mar. 14, 2017 in U.S. Appl. No. 14/723,672.
Non-Final Office Action dated Jan. 3, 2018 in U.S. Appl. No. 14/723,672.
Notice of Allowance dated Apr. 24, 2018, in U.S. Appl. No. 14/723,672.

* cited by examiner

PHOTOALIGNMENT AGENT, PHOTOALIGNMENT LAYER, LIQUID CRYSTAL DISPLAY DEVICE, AND METHOD OF MANUFACTURING THE SAME

CROSS-REFERENCE TO RELATED APPLICATION

This application claims priority from and the benefit of Korean Patent Application No. 10-2014-0117938 filed on Sep. 4, 2014, which is hereby incorporated by reference for all purposes as if fully set forth herein.

BACKGROUND

Field

Exemplary embodiments relate to a photoalignment agent, a photoalignment layer, a liquid crystal display device, and a manufacturing method thereof.

Discussion of the Background

In a liquid crystal element, to display images, that is, to switch liquid crystals between sheets of transparent conductive glass through an external electrical field, the liquid crystals must be aligned in a predetermined direction at the interface between the liquid crystals and the transparent conductive glass. The degree of uniformity of the liquid crystal alignment is an important factor for determining the display quality of the liquid crystal display device.

In the conventional method of aligning the liquid crystals, a rubbing method where a polymer layer such as a polyimide is coated on a substrate such as glass and the surface is rubbed in a predetermined direction by using a fiber material such as nylon or polyester is used. However, minute particles or an electrostatic discharge (ESD) may be generated when the fiber material and the polymer layer are rubbed against each other, and they may cause a serious problem during the manufacturing of the liquid crystal panel.

To solve this problem, a photoalignment method where anisotropy is induced to the polymer layer by light irradiation to align the liquid crystals has been researched.

The above information disclosed in this Background section is only for enhancement of understanding of the background of the invention and therefore it may contain information that does not form the prior art that is already known in this country to a person of ordinary skill in the art.

SUMMARY

The exemplary embodiments of the present invention has been made in an effort to provide a photoalignment agent, a photoalignment layer, a liquid crystal display device, and a manufacturing method thereof, having advantages of being capable of optimizing an afterimage and a film strength.

Additional aspects will be set forth in the detailed description which follows, and, in part, will be apparent from the disclosure, or may be learned by practice of the inventive concept.

An exemplary embodiment of the present invention provides a photoalignment agent including: (a) a copolymer formed from at least one compound of cyclobutanedianhydride (CBDA) and a cyclobutanedianhydride derivative, and a first diamine including alkylene group ($-C_kH_{2k}-$, k being a natural number); and (b) a cross-linking agent including an alkylene group ($-C_nH_{2n}-$, n being a natural number).

The cross-linking agent may include at least one of compounds that are respectively represented by Chemical Formula 1, Chemical Formula 2, and Chemical Formula 3.

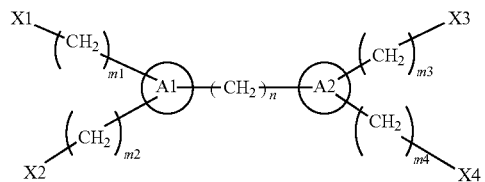

Chemical Formula 1

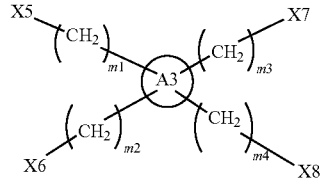

Chemical Formula 2

Chemical Formula 3

In Chemical Formula 1, Chemical Formula 2, and Chemical Formula 3, n indicates a natural number in a range of 3 to 11, each of m1 to m4 may independently indicate a natural number in a range of 1 to 4, A1 and A2 may independently indicate

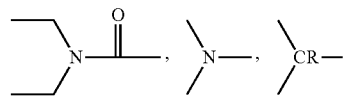

(R being H or an alkyl group with a carbon number of 1 to 3, an aromatic compound with a carbon number of 6 to 30, or an aliphatic cyclic compound with a carbon number of 4 to 20, A3 being

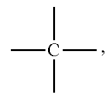

an aromatic compound with a carbon number of 6 to 30, or an aliphatic cyclic compound with a carbon number of 4 to 20, A4 being a single bond, $-CH_2-$, $-COO-$, $-OCO-$, $-S-$, $-O-$, an aromatic compound with a carbon number of 6 to 30, or an aliphatic cyclic compound with a carbon number of 4 to 20), and each of X1, X2, X3, X4, X5, X6, X7, X8, X9, and X10 independently indicates $-OH$, $-NH_2$, an aryl group, a vinyl group, or

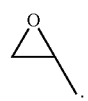

The cross-linking agent may include a compound that is represented by Chemical Formula 1-1.

Chemical Formula 1-1

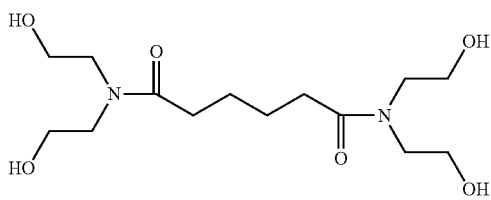

The first diamine may include a compound that is represented by Chemical Formula 4.

Chemical Formula 4

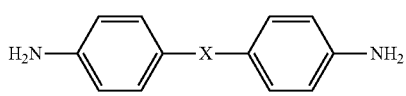

In Chemical Formula 4, X may indicate —(CH$_2$)$_h$—, —S—(CH$_2$)$_h$—S—, —O—(CH$_2$)$_h$—O—,

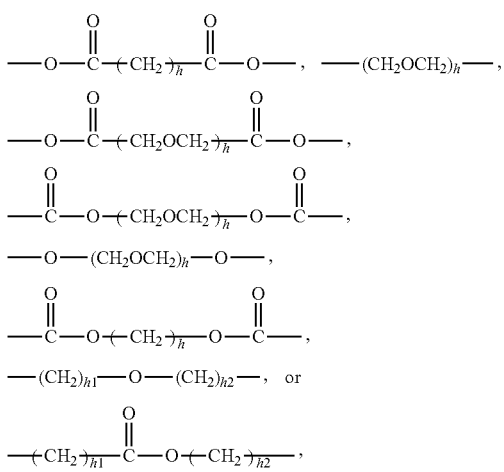

h may indicate a natural number in a range of 1 to 10, and h1 and h2 may indicate natural numbers that are selected to obtain a range of 2 to 10 as a sum of carbon numbers of the alkylene group of X.

The copolymer may further include a polymer formed from at least one of cyclobutanedianhydride and a cyclobutanedianhydride derivative; and a polymer of a second diamine that is represented by Chemical Formula 5.

Chemical Formula 5

The cyclobutanedianhydride may include a compound that is represented by Chemical Formula 6, and the cyclobutanedianhydride derivative may include a compound that is represented by Chemical Formula 7.

Chemical Formula 6

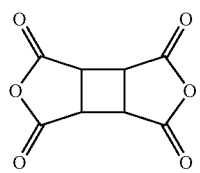

Chemical Formula 7

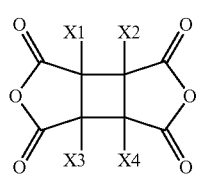

wherein, in Chemical Formula 7, X1, X2, X3, and X4 may independently indicate hydrogen, a halogen, or an alkyl group, and at least one of X1, X2, X3, and X4 may not indicate hydrogen.

The copolymer may include polyamic acid.

The photoalignment agent may further include at least one solvent of N-methyl-2-pyrolidone (NMP) and 2-butyl Cellosolve.

An exemplary embodiment of the present invention provides a liquid crystal display device including: a first substrate; a thin film transistor disposed on the first substrate; a first electrode connected to the thin film transistor; and a first alignment layer disposed on the first electrode. The first alignment layer includes: a copolymer formed from at least one compound of cyclobutanedianhydride (CBDA) and a cyclobutanedianhydride derivative, and a first diamine including alkylene group (—C$_k$H$_{2k-}$, k being a natural number); and a cross-linking agent including an alkylene group (—C$_n$H$_{2n-}$, n being a natural number), wherein the copolymer includes polyimide.

The cross-linking agent may include at least one of compounds that are respectively represented by Chemical Formula 1, Chemical Formula 2, and Chemical Formula 3.

Chemical Formula 1

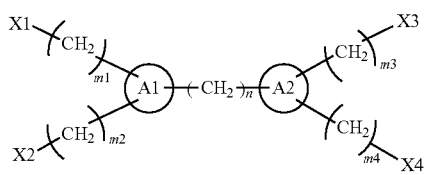

Chemical Formula 2

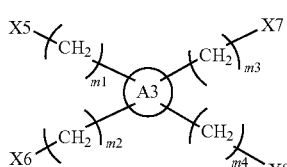

Chemical Formula 3

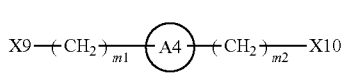

In Chemical Formula 1, Chemical Formula 2, and Chemical Formula 3, A1 and A2 may independently indicate

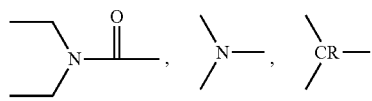

(R being H or an alkyl group with a carbon number of 1 to 3, an aromatic compound with a carbon number of 6 to 30, or an aliphatic cyclic compound with a carbon number of 4 to 20, A3 being

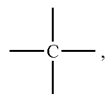

an aromatic compound with a carbon number of 6 to 30, or an aliphatic cyclic compound with a carbon number of 4 to 20, A4 being a single bond, —$CH_2$—, —COO—, —OCO—, —S—, —O—, an aromatic compound with a carbon number of 6 to 30, or an aliphatic cyclic compound with a carbon number of 4 to 20), and each of X1, X2, X3, X4, X5, X6, X7, X8, X9, and X10 may independently indicate —OH, —$NH_2$, an aryl group, a vinyl group, or

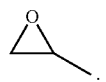

The cross-linking agent may include a compound that is represented by Chemical Formula 1-1.

Chemical Formula 1-1

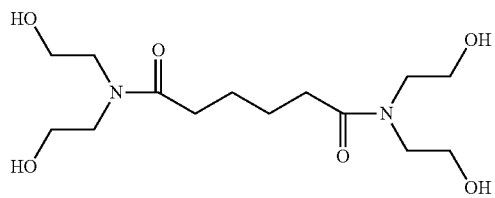

The first diamine may include a compound that is represented by Chemical Formula 4.

Chemical Formula 4

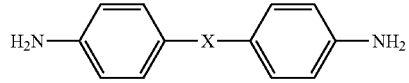

In Chemical Formula 4, X may indicate —$(CH_2)_h$—, —S—$(CH_2)_h$—S—, —O—$(CH_2)_h$—O—,

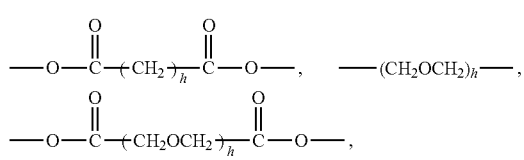

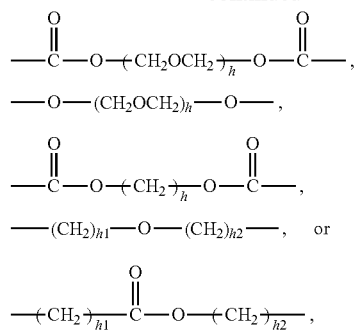

h may indicate a natural number in a range of 1 to 10, and h1 and h2 may indicate natural numbers that are selected to obtain a range of 2 to 10 as a sum of carbon numbers of the alkylene group of X.

The copolymer further includes a polymer formed from at least one of cyclobutanedianhydride and a cyclobutanedianhydride derivative; and a polymer of a second diamine that is represented by Chemical Formula 5.

Chemical Formula 5

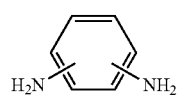

The polymer included in the photoalignment layer may include at least one of repeated units that are respectively represented by Chemical Formula 8, Chemical Formula 9, Chemical Formula 10, and Chemical Formula 11.

Chemical Formula 8

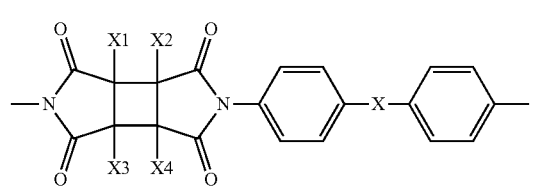

Chemical Formula 9

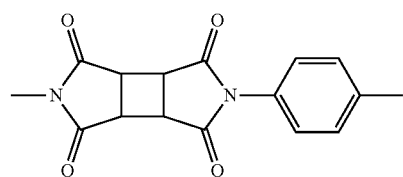

Chemical Formula 10

Chemical Formula 11

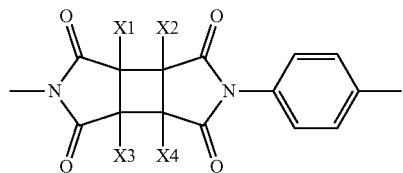

In Chemical Formula 8 and Chemical Formula 9, X may indicate —$(CH_2)_h$—, —S—

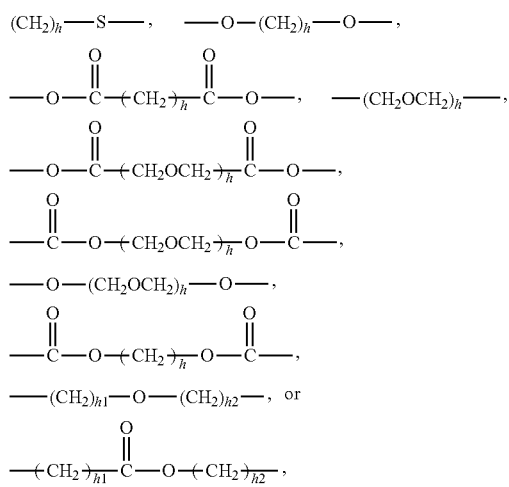

h may indicate a natural number in a range of 1 to 10, and h1 and h2 may indicate natural numbers that are selected to obtain 10 as a sum of carbon numbers of the alkylene group of X. In Chemical Formula 9 and Chemical Formula 11, X1, X2, X3, and X4 may independently indicate hydrogen, a halogen, or an alkyl group, and at least one of X1, X2, X3, and X4 may not indicate hydrogen.

The copolymer may include a compound that is represented by Chemical Formula 12.

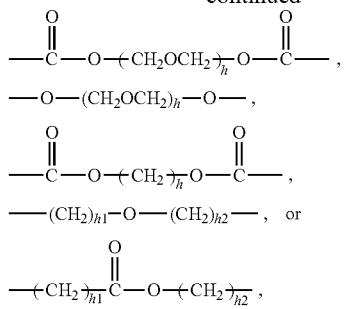

h may indicate a natural number in a range of 1 to 10, h1 and h2 may indicate natural numbers that are selected to obtain 10 as a sum of carbon numbers of the alkylene group of X, a:b may indicate 20:80 to 50:50, X1, X2, X3, and X4 may independently indicate hydrogen, a halogen, or an alkyl group, and at least one of X1, X2, X3, and X4 may not indicate hydrogen.

The liquid crystal display device may further include a second electrode disposed on the first substrate, wherein an insulating layer is disposed between the first electrode and the second electrode.

The first electrode may include a plurality of branch electrodes, and the second electrode may have a planar shape.

The branch electrodes may be overlapped with the second electrode having the planar shape.

The liquid crystal display device may further include a passivation layer positioned between the thin film transistor and the second electrode, wherein the thin film transistor and the first electrode are connected to each other through a contact hole passing through the passivation layer and the insulating layer.

The liquid crystal display device may further include: a second substrate facing the first substrate; a second alignment layer positioned on the second substrate; and a liquid crystal layer positioned between the first substrate and the second substrate and including a liquid crystal molecule, wherein the second alignment layer is formed of the same material as the first alignment layer.

Chemical Formula 12

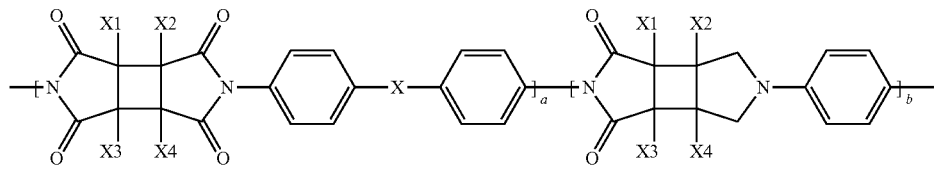

In Chemical Formula 12, X may indicate —$(CH_2)_h$—, —S—$(CH_2)_h$—S—, —O—$(CH_2)_h$—O—,

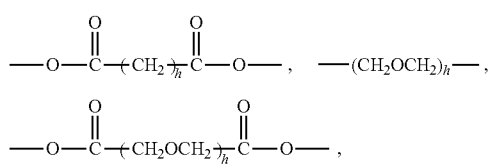

According to the exemplary embodiments of the present invention, it is possible to embody a photoalignment layer and a liquid crystal display device with optimized afterimage and film strength by using diamine including a flexible group and a cross-linking agent including a flexible group to form a photoalignment layer.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE EMBODIMENTS

Figure 1:
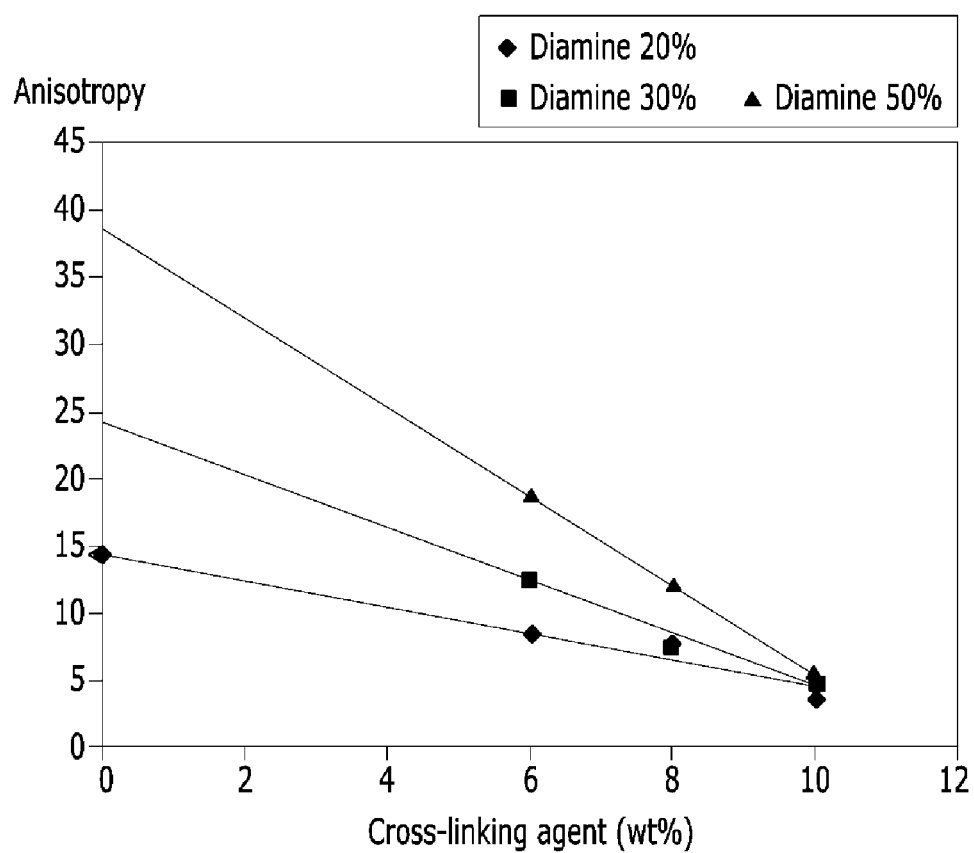
FIG. 1 is a graph illustrating anisotropy according to a flexible diamine content and a flexible cross-linking agent content in a photoalignment layer according to an exemplary embodiment of the present invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

A photoalignment agent according to an exemplary embodiment of the present invention includes (a) a copolymer formed from at least one compound of cyclobutanedianhydride (CBDA) and a cyclobutanedianhydride derivative, and a first diamine including alkylene group ($—C_kH_{2k}—$, k being a natural number), and (b) a cross-linking agent including an alkylene group ($—C_nH_{2n}—$, n being a natural number).

Herein, the cyclobutanedianhydride may be a compound that is represented by Chemical Formula 6, and the cyclobutanedianhydride derivative may be a compound that is represented by Chemical Formula 7.

Chemical Formula 6

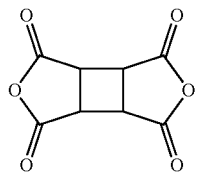

Chemical Formula 7

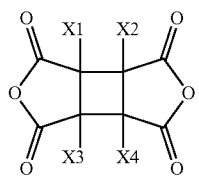

In Chemical Formula 7, X1, X2, X3, and X4 independently indicate hydrogen, a halogen, or an alkyl group, and at least one of X1, X2, X3, and X4 does not indicate hydrogen. The cyclobutanedianhydride derivative includes a compound that is represented by Chemical Formula 7-1 or Chemical Formula 7-2.

Chemical Formula 7-1

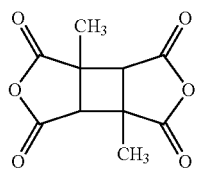

Chemical Formula 7-2

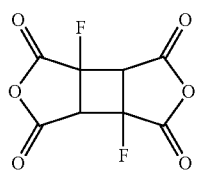

In the present exemplary embodiment, the first diamine may be a compound that is represented by Chemical Formula 4.

Chemical Formula 4

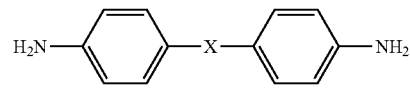

In Chemical Formula 4, X indicates $—(CH_2)_h—$, $—S—(CH_2)_h—S—$, $—O—(CH_2)_h—O—$,

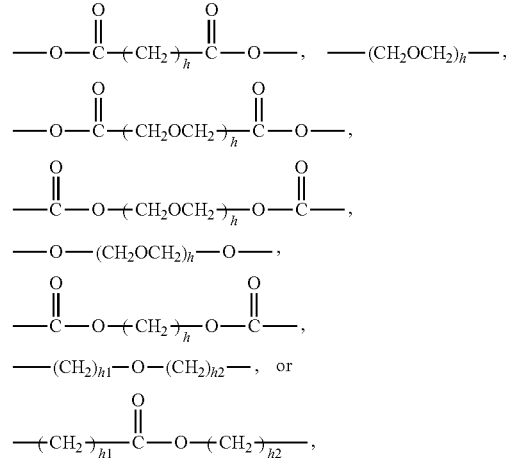

$—(CH_2)_{h1}—O—(CH_2)_{h2}—$, or

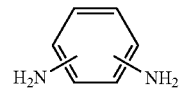

h indicates a natural number in a range of 1 to 10, and h1 and h2 indicate natural numbers that are selected to obtain 10 as a sum of carbon numbers of the alkylene group of X.

In the present exemplary embodiment, the photoalignment agent may further include a second diamine that is represented by Chemical Formula 5.

Chemical Formula 5

$H_2N—\langle\rangle—NH_2$

The second diamine is not limited to the compound that is represented by Chemical Formula 5, but may be a compound in which hydrogen coupled to ring-like carbon is substituted with an alkyl group, a halogen, sulfur, or the like from Chemical Formula 5, an aromatic diamine such as p-phenylenediamine, m-phenylenediamine, 2,5-diaminotoluene, 2,6-diaminotoluene, 4,4'-diaminobiphenyl, 3,3'-dimethyl-4,4'-diaminobiphenyl, 3,3'-dimethoxy-4,4'-diaminobiphenyl, diaminodiphenylmethane, diaminodiphenylether, 2,2'-diaminodiphenylpropane, bis(3,5-diethyl-4-aminophenyl)methane, diaminodiphenylsulfone, diaminobenzophenone, diaminonaphthalene, 1,4-bis(4-aminophenoxy)benzene, 1,4-bis(4-aminophenyl)benzene, 9,10-bis(4-aminophenyl)anthracene, 1,3-bis(4-aminophenoxy)benzene, 4,4'-bis(4-aminophenoxy)diphenyl sulfone, 2,2-bis[4-(4-minophenoxy)phenyl]propane, 2,2-bis(4-aminophenyl)hexafluoropropane, or 2,2-bis[4-(4-minophenoxy)phenyl]hexafluoropropane, an aliphatic diamine such as bis(4-aminocyclohexyl)methane or bis(4-amino-3-methylcyclohexyl)methane, and an aliphatic diamine such as tetramethylene diamine or hexamethylenediamine. However, the second diamine is not limited thereto, and may include most kinds of diamines which are not easily bendable excluding the first diamine.

In the present exemplary embodiment, a mole ratio of the first diamine and the second diamine may be in a range of 1:99 to 99:1. For example, the mole ratio may be in a range of about 20:80 to 50:50.

As such, the first diamine according to the present exemplary embodiment includes an alkylene group ($-CH_2-$) pertaining to a flexible group, and thus the photoalignment layer formed by using the photoalignment agent containing the copolymer of the first diamine has a flexible characteristic. Accordingly, the anisotropy is improved, thereby ameliorating the afterimage.

In the present exemplary embodiment, the cross-linking agent may include at least one of compounds that are respectively represented by Chemical Formula 1, Chemical Formula 2, and Chemical Formula 3.

Chemical Formula 1

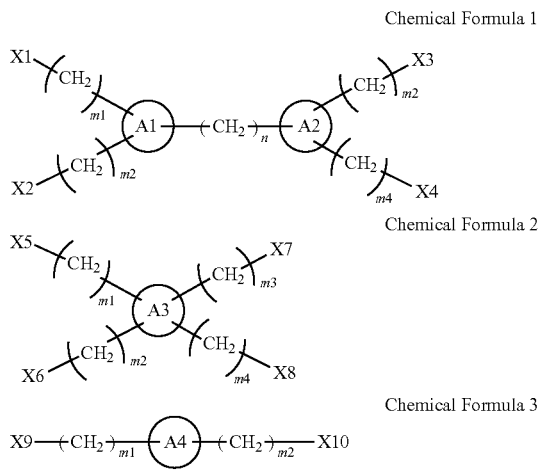

Chemical Formula 2

Chemical Formula 3

In Chemical Formula 1, Chemical Formula 2, and Chemical Formula 3, n indicates a natural number in a range of 3 to 11, and each of m1 to m4 independently indicates a natural number in a range of 1 to 4.

In Chemical Formula 1, Chemical Formula 2, and Chemical Formula 3, A1 and A2 independently indicate

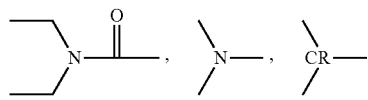

herein, R is H or an alkyl group with a carbon number of 1 to 3, an aromatic compound with a carbon number of 6 to 30, or an aliphatic cyclic compound with a carbon number of 4 to 20, A3 being

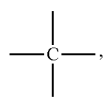

an aromatic compound with a carbon number of 6 to 30, or an aliphatic cyclic compound with a carbon number of 4 to 20, and A4 being a single bond, $-CH_2-$, $-COO-$, $-OCO-$, $-S-$, $-O-$, an aromatic compound with a carbon number of 6 to 30, or a aliphatic cyclic compound with a carbon number of 4 to 20. Herein, the aromatic compound may be a phenyl group, an alkyl substituted phenyl, a fluorine substituted phenyl, a biphenyl, a naphthalene, an anthracene, or a pentacene, without being limited thereto, and the aliphatic cyclic compound may be a cyclohexane, a cyclobutane, or a cyclopentane, without being limited thereto.

In Chemical Formula 1, Chemical Formula 2, and Chemical Formula 3, each of X1, X2, X3, X4, X5, X6, X7, X8, X9, and X10 independently indicates $-OH$, $-NH_2$, an aryl group, a vinyl group, or

In the present exemplary embodiment, the cross-linking agent may be included in the photoalignment agent at about 3 wt % to 10 wt % with respect to all contents. For example, the cross-linking agent may be included in the photoalignment agent at about 5 wt % to 7 wt %.

In the present exemplary embodiment, the cross-linking agent may include a compound that is represented by Chemical Formula 1-1.

Chemical Formula 1-1

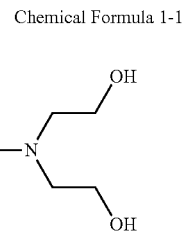

As described above, the cross-linking agent according to the present exemplary embodiment includes the alkylene group ($-CH_2-$) pertaining to the flexible group, and thus the photoalignment layer formed by using the photoalignment agent added with the cross-linking agent of the present exemplary embodiment ameliorates the film strength and minimizes deterioration of the afterimage.

Hereinafter, an example of a manufacturing method of a photoalignment agent will be described according to the present exemplary embodiment.

Photoalignment Agent Manufacturing Method

A compound represented by Chemical Formula 4 at 0.5 moles and N-methyl-2-pyrolidone were mixed in a flask with four necks and including an agitator, a temperature adjuster, a gas injector, and a cooler, under a dark room condition while passing nitrogen through the flask, to produce a mixed solution. A compound represented by Chemical Formula 7 at 1.0 mole was added into the mixed solution, and was subjected to agitation for about one hour. Then, a compound represented by Chemical Formula 5 at 0.5 moles was added thereinto to facilitate a reaction. In this case, the reaction was performed for about 24 hours while maintaining the temperature in a range of 30 to 60° C., thereby producing a polyamic acid solution. This polyamic acid solution was distillated to obtain polyamic acid. The weight average molecular weight of the polyamic acid was in a range of 3 to 50,000. A mixed solvent (volume ratio=about 7:2) in which N-methyl-2-pyrolidone (NMP) and 2-butyl cellosolve were mixed was added to the polyamic acid, and was subjected to agitation for 24 hours. A cross-linking agent represented by Chemical Formula 1-1 at about 5 wt % to 7 wt % was added into the mixed solvent, thereby producing a photoalignment agent including the polyamic acid and the cross-linking agent.

Chemical Formula 4

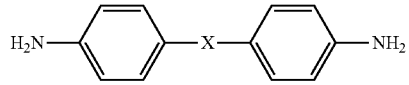

Chemical Formula 5

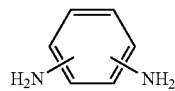

Chemical Formula 7

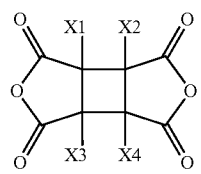

In Chemical Formula 7, X1 and X4 indicate a methyl group, and X2 and X3 indicate hydrogen.

Chemical Formula 1-1

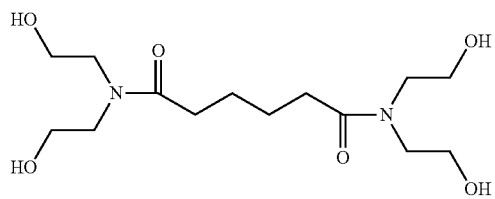

The aforementioned photoalignment agent was coated on an electrode, and the coated photoalignment agent was baked. The baking was performed by two steps of pre-baking and hard-baking.

Thereafter, the first alignment layer may be formed by irradiating polarized light to the photoalignment agent. In this case, the irradiated light may be ultraviolet light having a wavelength range of 240 nanometers to 380 nanometers. Preferably, the ultraviolet light with a wavelength of 254 nanometers may be used. The polarized light may have energy in a range of 0.20 J/cm² to 1.0 J/cm². For example, the polarized light may have energy in a range of 0.40 J/cm² to 0.50 J/cm².

In order to increase an alignment property, the photoalignment layer 11 may be baked once more.

In the present exemplary embodiment, the polymer included in the photoalignment layer may include at least one of repeated units that are respectively represented by Chemical Formula 8, Chemical Formula 9, Chemical Formula 10, and Chemical Formula 11.

Chemical Formula 8

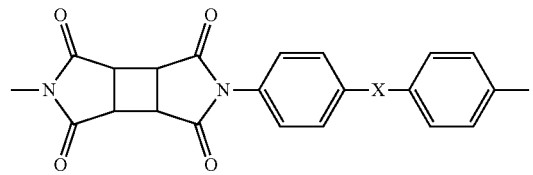

Chemical Formula 9

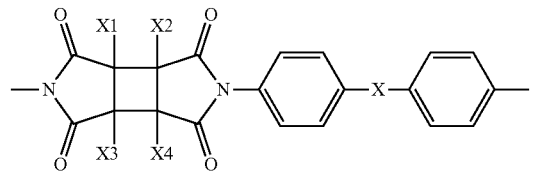

Chemical Formula 10

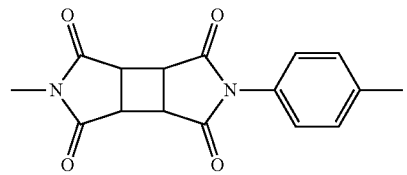

Chemical Formula 11

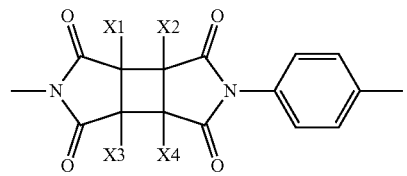

In Chemical Formula 8 and Chemical Formula 9, X indicates —(CH$_2$)$_h$—, —S—(CH$_2$)$_h$—S—, —O—(CH$_2$)$_h$—O—,

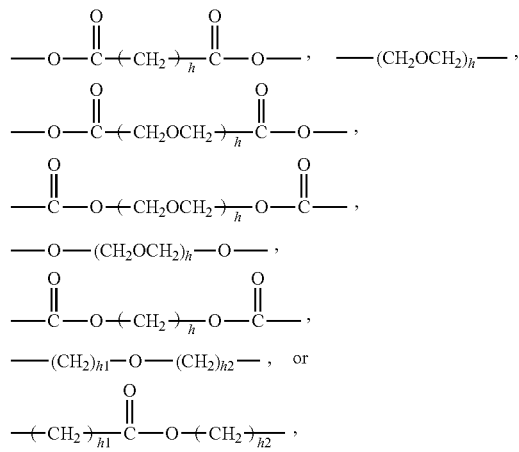

h indicates a natural number in a range of 1 to 10, and h1 and h2 indicate natural numbers that are selected to obtain 10 as a sum of carbon numbers of the alkylene group of X. In Chemical Formula 9 and Chemical Formula 11, X1, X2, X3, and X4 independently indicate hydrogen, a halogen, or an alkyl group, and at least one of X1, X2, X3, and X4 does not indicate hydrogen.

For example, the photoalignment layer according to the present exemplary embodiment may include a copolymer represented by Chemical Formula 12.

Chemical Formula 12

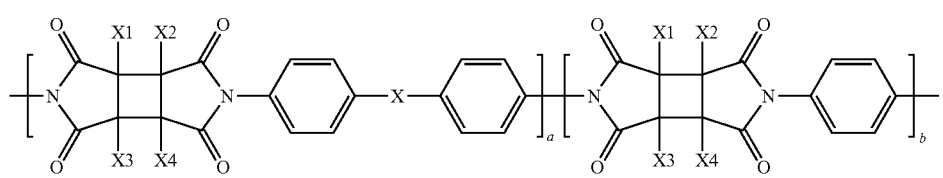

In Chemical Formula 12, X indicates —(CH$_2$)$_h$—, —S—(CH$_2$)$_h$—S—, —O—(CH$_2$)$_h$—O—,

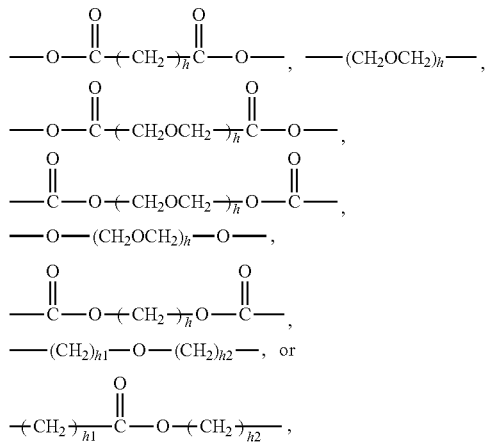

h indicates a natural number in a range of 1 to 10, h1 and h2 indicate natural numbers that are selected to obtain 10 as a sum of carbon numbers of the alkylene group of X, a:b indicates 20:80 to 50:50, X1, X2, X3, and X4 independently indicate hydrogen, a halogen, or an alkyl group, and at least one of X1, X2, X3, and X4 does not indicate hydrogen.

FIG. 1 is a graph illustrating anisotropy according to a flexible diamine content and a flexible cross-linking agent content in a photoalignment layer according to an exemplary embodiment of the present invention.

Referring to FIG. 1, in the present exemplary embodiment, as the flexible diamine content is increased, the anisotropy may also be increased, thereby ameliorating the afterimage. However, the film strength of the photoalignment layer may be deteriorated. In general, when the rigid cross-linking agent is added into the photoalignment layer, the film strength is improved. However, when the rigid cross-linking agent is added, the afterimage may be deteriorated.

Figure 2:
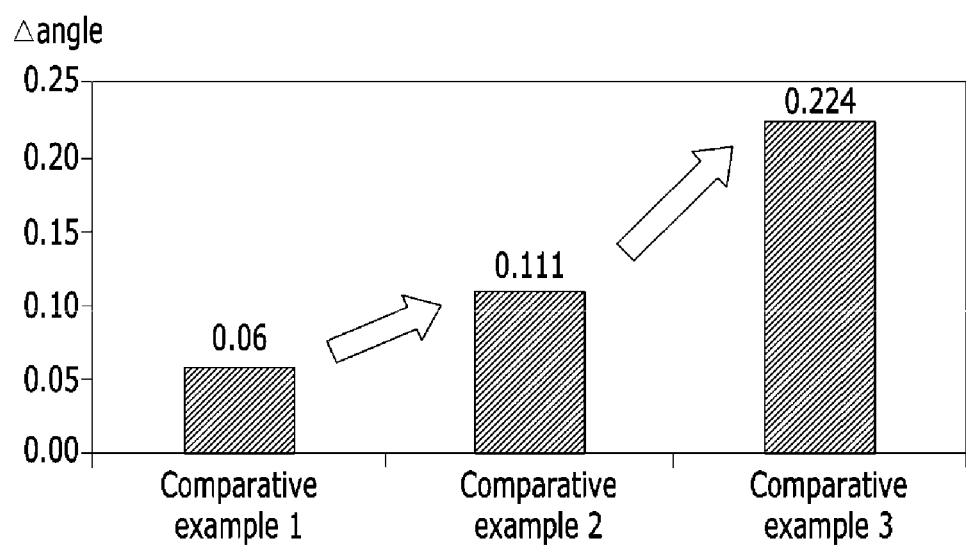
FIG. 2 is a graph illustrating the state of an afterimage in the case of adding a rigid cross-linking agent into a photoalignment layer.

FIG. 2 is a graph illustrating the state of an afterimage in the case of adding a rigid cross-linking agent into a photoalignment layer.

In FIG. 2, in Comparative Example 1, a photoalignment layer in which no cross-linking agent is added into a photoalignment agent including the copolymer of a flexible diamine according to an exemplary embodiment of the present invention was used. In Comparative Example 2, a photoalignment layer in which a rigid cross-linking agent represented by Chemical Formula 4R at 3 wt % is added into the photoalignment agent including the copolymer of the flexible diamine was used. In Comparative Example 3, a photoalignment layer in which a rigid cross-linking agent represented by Chemical Formula 4R at 3 wt % is added into the photoalignment agent including the copolymer of the flexible diamine was used. Commonly, Comparative Example 1, Comparative Example 2, and Comparative Example 3 were subjected to a first baking process at a temperature of 210° C. for about 30 minutes, and then to polarization irradiation at 0.5 J/cm$^2$. Then, a second baking process was performed thereon at the temperature of 210° C. for about 30 minutes.

Chemical Formula 4R

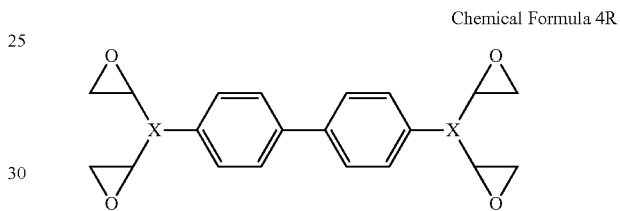

In Chemical Formula 4R, X may indicate

Referring to FIG. 2, as more rigid cross-linking agent is added, the afterimage is gradually deteriorated. Accordingly, this rigid cross-linking agent is not appropriate for the photoalignment layer formed by using the flexible diamine as a cross-linking agent for improving the film strength.

Figure 3:
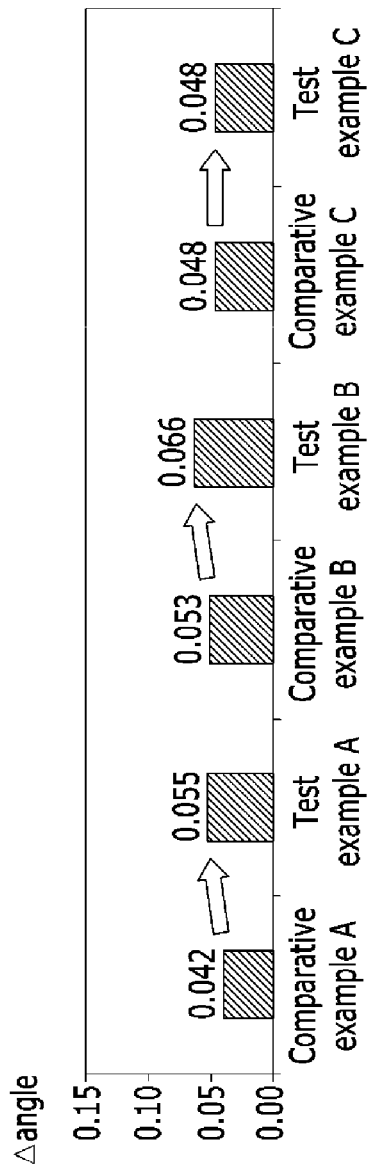
FIG. 3 is a graph illustrating the state of an afterimage in the case of adding a flexible cross-linking agent into a photoalignment layer.

FIG. 3 is a graph illustrating the state of an afterimage in the case of adding a flexible cross-linking agent into a photoalignment layer.

In FIG. 3, in Comparative Example A, Comparative Example B, and Comparative Example C, photoalignment layers having no cross-linking agent were used. In Test Example A, Test Example B, and Test Example C, photoalignment layers in which a flexible cross-linking agent was added at 3 wt % were used. Comparative Example A and Test Example A were commonly subjected to the first baking process at a temperature 230° C. for about 900 seconds, and then to the polarization irradiation at 0.5 J/cm$^2$. Subsequently, the second baking process was performed thereon at a temperature of 210° C. for about 900 seconds. Comparative Example B and Test Example B were commonly subjected to the first baking process at the temperature 230° C. for about 900 seconds, and then to the polarization irradiation at 0.5 J/cm$^2$. Subsequently, the second baking process was performed thereon at the temperature of 230° C. for about 900 seconds. Comparative Example C and Test Example C were commonly subjected to the first baking process at a temperature 240° C. for about 900 seconds, and then to the polarization irradiation of 0.5 J/cm$^2$. Subsequently, the second baking process was performed thereon at the temperature of 210° C. for about 900 seconds.

Referring to FIG. 3, the afterimage was not deteriorated or was slightly deteriorated in Test Examples A, B, and C adding the flexible cross-linking agent, as compared with Comparative Examples A, B, and C.

Figure 4:
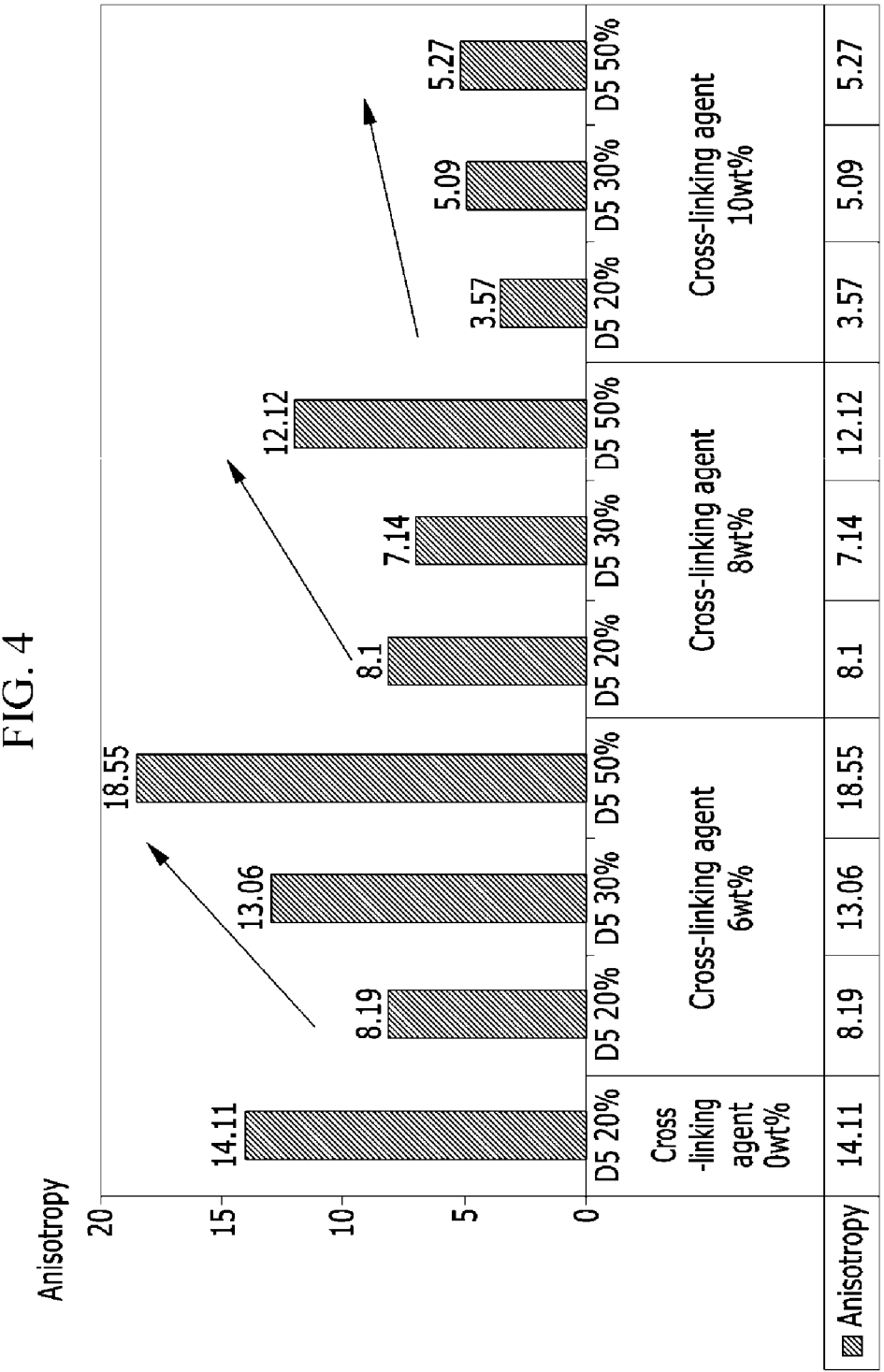
FIG. 4 is a graph illustrating anisotropy in the case of changing a flexible diamine content and a flexible cross-linking agent content in a photoalignment layer according to an exemplary embodiment of the present invention.

FIG. 4 is a graph illustrating anisotropy in the case of changing a flexible diamine content and a flexible cross-linking agent content in a photoalignment layer according to an exemplary embodiment of the present invention.

Referring to FIG. 4, the anisotropy may be reduced to deteriorate the afterimage by adding a flexible cross-linking agent according to an exemplary embodiment of the present invention as compared with the case of adding no flexible cross-linking agent. However, in the present exemplary embodiment, a photoalignment layer is formed by using a flexible diamine, and thus the reduction of anisotropy caused by adding the flexible cross-linking agent can be sufficiently compensated, or the anisotropy can be increased by more than the reduction. In FIG. 4, for example, D5 20% indicates a mole ratio of a mixed flexible diamine as compared with a rigid diamine.

Hereinafter, a principle of improving the film strength and minimizing deterioration of the afterimage when a flexible cross-linking agent according to the present exemplary embodiment is used will be described with reference to FIG. 5 to FIG. 7.

Figure 5:
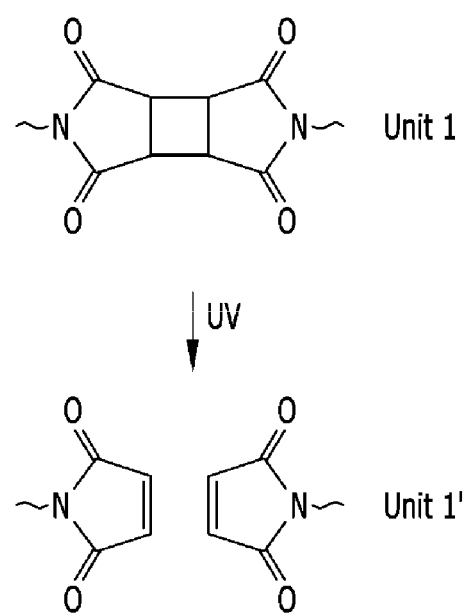
FIG. 5 is a structural formula illustrating decomposition of the polyimide in a photoalignment layer according to an exemplary embodiment of the present invention.

FIG. 5 is a structural formula illustrating decomposition of the polyimide in a photoalignment layer according to an exemplary embodiment of the present invention. FIG. 6 illustrates a change process from isotropic to anisotropic in a photoalignment layer according to an exemplary embodiment of the present invention.

Referring to FIG. 5, a polyamic acid is formed by copolymerizing cyclobutanedianhydride (CBDA) and the diamine. Through a baking process, a polyimide (Unit 1) is formed, and UV is radiated on the polyimide to form a maleimide (Unit 1').

Figure 6:
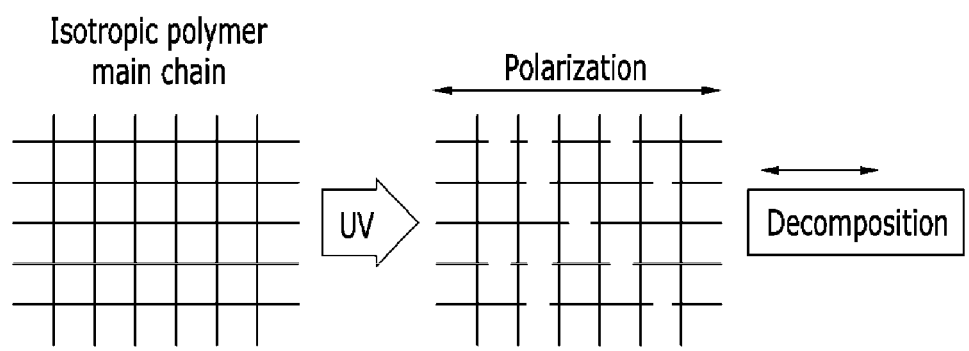
FIG. 6 illustrates a change process from isotropic to anisotropic in a photoalignment layer according to an exemplary embodiment of the present invention.

FIG. 6 illustrates that a polymer main chain including the polyimide (unit 1) illustrated in FIG. 5 is decomposed to be aligned according to radiation of polarized UV. Referring to FIG. 6, polarized UV is radiated on an isotropic polymer main chain, photodecomposition occurs in a polarization direction (absorption axis direction), and thus a photoalignment layer may be aligned in a direction that is perpendicular to the polarization. Herein, if an exposure amount is excessively small, since decomposition efficiency is low, the alignment property may deteriorate. On the contrary, if the exposure amount is excessively increased, since decomposition efficiency is increased, decomposition occurs in another direction in addition to the polarization direction, and thus the alignment property may deteriorate.

Figure 7:
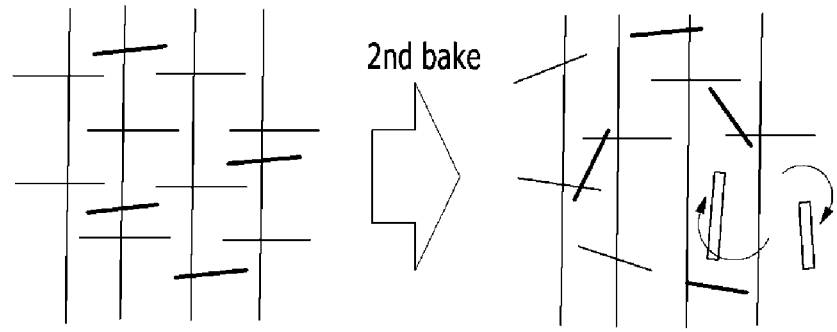
FIG. 7 illustrates a principle of ameliorating an afterimage in a photoalignment layer formed by using a photoalignment agent added with a flexible cross-linking agent according to an exemplary embodiment of the present invention.
Figure 7:
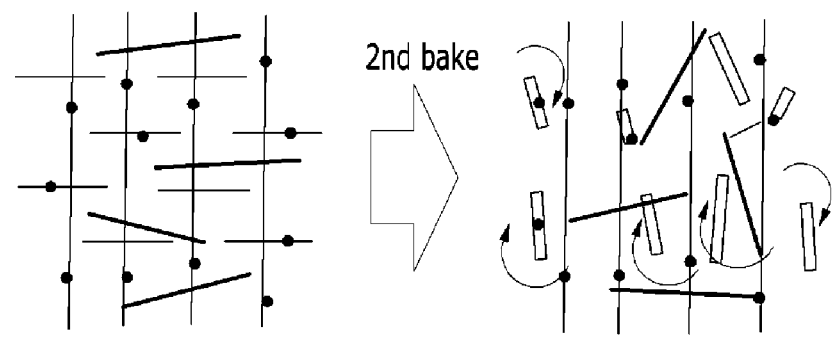

FIG. 7 illustrates a principle of ameliorating an afterimage in a photoalignment layer formed by using a photoalignment agent added with a flexible cross-linking agent according to an exemplary embodiment of the present invention.

Referring to FIG. 7, when the second bake process is performed on the photoalignment layer including the rigid cross-linking agent, the rigid cross-linking agent obstructs the rearrangement of the photo-decomposed molecules. As a result, it is difficult to accomplish a high effect of ameliorating the afterimage with the rearrangement. However, as in the present exemplary embodiment, when the photoalignment layer including the flexible cross-linking agent is subjected to the second baking process, the photo-decomposed molecules can be more easily rearranged, thereby increasing the effect of ameliorating the afterimage with the rearrangement.

Hereinafter, a liquid crystal display device including a photoalignment layer according to an exemplary embodiment of the present invention will be described.

Figure 8:
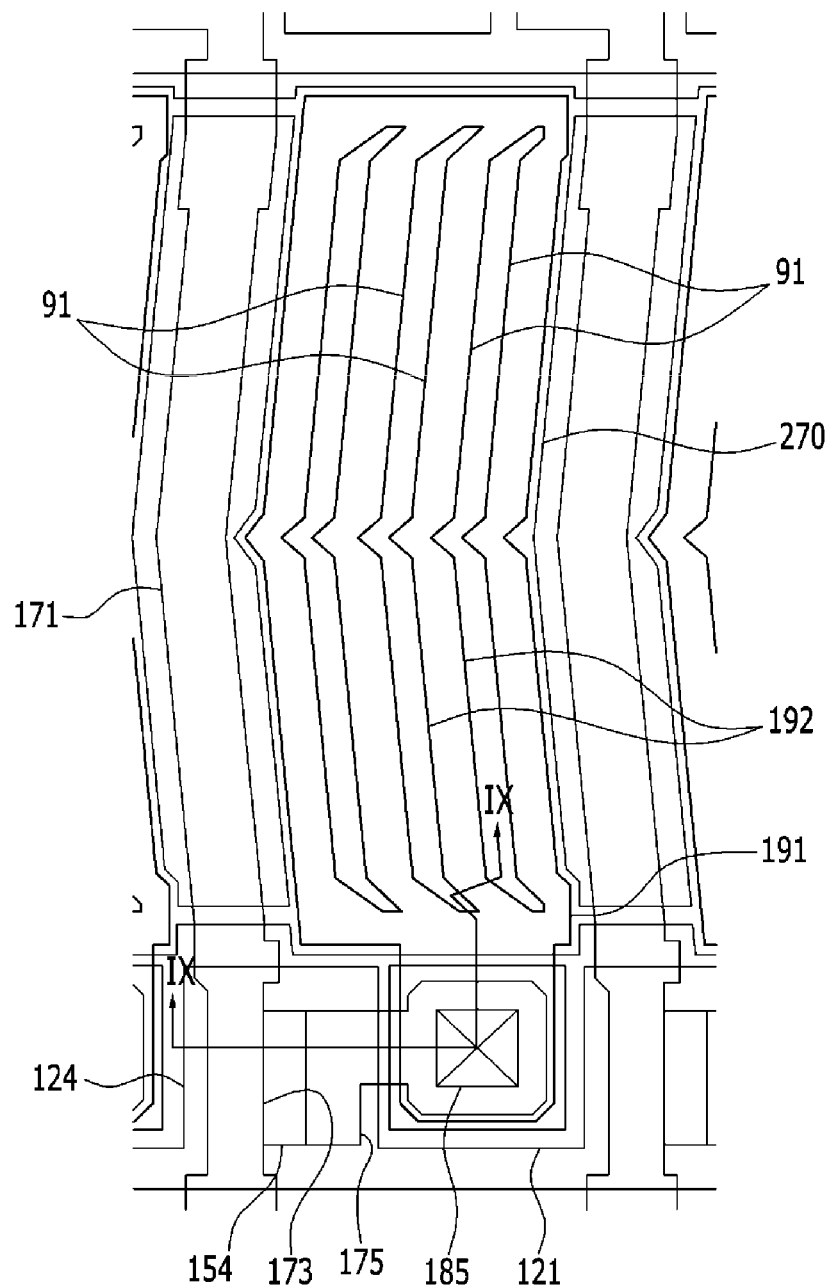
FIG. 8 is a top plan view illustrating a liquid crystal display device according to an exemplary embodiment of the present invention.
Figure 9:
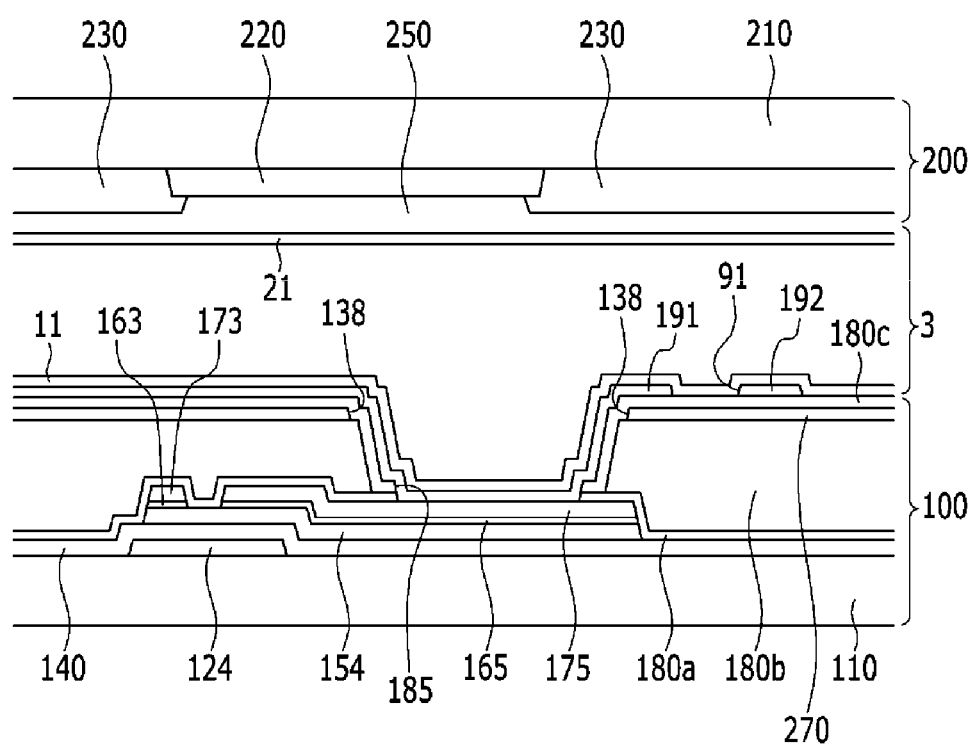
FIG. 9 is cross-sectional view taken along the line IX-IX of FIG. 8.

FIG. 8 is a top plan view illustrating a liquid crystal display device according to an exemplary embodiment of the present invention. FIG. 9 is a cross-sectional view taken along the line IX-IX of FIG. 8.

Referring to FIG. 8 and FIG. 9, the liquid crystal display device according to the exemplary embodiment of the present invention includes a lower display panel 100 and an upper display panel 200 facing each other, and a liquid crystal layer 3 injected therebetween.

First, the lower display panel 100 will be described.

A gate conductor including a gate line 121 is formed on a first substrate 110 made of transparent glass, plastic, or the like.

The gate line 121 includes a gate electrode 124 and a wide end portion (not illustrated) for connection with another layer or an external driving circuit. The gate line 121 may be made of an aluminum-based metal such as aluminum (Al) or an aluminum alloy, a silver-based metal such as silver (Ag) or a silver alloy, a copper-based metal such as copper (Cu) or a copper alloy, a molybdenum-based metal such as molybdenum (Mo) or a molybdenum alloy, chromium (Cr), tantalum (Ta), and titanium (Ti). However, the gate line 121 may have a multilayer structure including at least two conductive layers having different physical properties.

A gate insulating layer 140 made of a silicon nitride (SiNx), a silicon oxide (SiOx), or the like is formed on the gate line 121. The gate insulating layer 140 may have a multilayer structure including at least two insulating layers having different physical properties.

A semiconductor layer 154 made of amorphous silicon or polysilicon is positioned on the gate insulating layer 140. The semiconductor layer 154 may include an oxide semiconductor.

Ohmic contacts 163 and 165 are formed on the semiconductor layer 154. The ohmic contacts 163 and 165 may be made of a material such as n+ hydrogenated amorphous silicon in which an n-type impurity such as phosphorus is doped at a high concentration, or of a silicide. The ohmic contacts 163 and 165 may be disposed on the semiconductor layer 154 to make a pair. In the case where the semiconductor layer 154 is the oxide semiconductor, the ohmic contacts 163 and 165 may be omitted.

A data conductor including a data line 171 including a source electrode 173 and a drain electrode 175 is formed on the ohmic contacts 163 and 165 and the gate insulating layer 140.

The data line 171 includes a wide end portion (not illustrated) for connection with another layer or an external driving circuit. The data line 171 transfers a data signal and mainly extends in a vertical direction to cross the gate line 121.

In this case, the data line 171 may have a first curved portion having a curved shape in order to acquire maximum transmittance of the liquid crystal display device, and the curved portion meets itself in a middle region of the pixel area to have a V-lettered shape.

The source electrode 173 is a part of the data line 171, and is disposed on the same line as the data line 171. The drain electrode 175 is formed to extend in parallel with the source electrode 173. Accordingly, the drain electrode 175 is parallel with the part of the data line 171.

The gate electrode 124, the source electrode 173, and the drain electrode 175 form one thin film transistor (TFT) together with the semiconductor layer 154, and a channel of the thin film transistor is formed in the semiconductor layer 154 portion between the source electrode 173 and the drain electrode 175.

The liquid crystal display device according to the exemplary embodiment of the present invention includes the source electrode 173 positioned on the same line with the data line 171 and the drain electrode 175 extending in parallel with the data line 171, and as a result, a width of the thin film transistor may be increased while an area occupied by the data conductor is not increased, thereby increasing an aperture ratio of the liquid crystal display device.

The data line 171 and the drain electrode 175 may be made of a refractory metal such as molybdenum, chromium, tantalum, and titanium, or an alloy thereof, and may have a multilayered structure including a refractory metal layer (not illustrated) and a low resistive conductive layer (not illustrated). An example of the multilayered structure may include a double layer of a chromium or molybdenum (alloy) lower layer and an aluminum (alloy) upper layer, or a triple layer of a molybdenum (alloy) lower layer, an aluminum (alloy) middle layer, and a molybdenum (alloy) upper layer.

A first passivation layer 180a is disposed on the data conductors 171, 173, and 175, the gate insulating layer 140, and an exposed portion of the semiconductor layer 154. The first passivation layer 180a may be made of an organic insulating material or an inorganic insulating material.

A second passivation layer 180b is formed on the first passivation layer 180a. The second passivation layer 180b may be made of an organic insulating material.

The second passivation layer 180b may be a color filter. In the case where the second passivation layer 180b is the color filter, the second passivation layer 180b may uniquely display one of primary colors, and an example of the primary colors may include three primary colors such as red, green, and blue, or yellow, cyan, and magenta, and the like. Although not illustrated, the color filter may further include a color filter displaying a mixed color of the primary colors or white other than the primary colors. In the case where the second passivation layer 180b is the color filter, the color filter 230 may be omitted in the upper display panel 200 to be described below. Unlike in the present exemplary embodiment, the second passivation layer 180b may be formed by using an organic insulating material, and a color filter (not shown) may be formed between the first passivation layer 180a and the second passivation layer 180b.

A common electrode 270 is formed on the second passivation layer 180b. The common electrode 270 has a planar shape and may be formed on the entire surface of the substrate 110 as a whole plate, and has an opening 138 disposed in a region corresponding to a periphery of the drain electrode 175. That is, the common electrode 270 may have the planar shape as the plate shape.

Common electrodes 270 positioned at adjacent pixels are connected to each other to receive a common voltage having a predetermined magnitude supplied from outside of a display area.

An insulating layer 180c is positioned on the common electrode 270. The insulating layer 180c may be made of an organic insulating material, an inorganic insulating material, or the like.

A pixel electrode 191 is positioned on the insulating layer 180c. The pixel electrode 191 includes a curved edge which is substantially parallel with the curved portion of the data line 171. The pixel electrode 191 has a plurality of cutouts 91, and includes a plurality of branch electrodes 192 positioned between the adjacent cutouts 91.

The pixel electrode 191 is a first field generating electrode or a first electrode, and the common electrode 270 is a second field generating electrode or a second electrode. A horizontal electric field (ex, fringe field) may be generated between the pixel electrode 191 and the common electrode 270.

A first contact hole 185 exposing the drain electrode 175 is formed in the first passivation layer 180a, the second passivation layer 180b, and the insulating layer 180c. The pixel electrode 191 is physically and electrically connected to the drain electrode 175 through the contact hole 185 to receive a voltage from the drain electrode 175.

A first alignment layer 11 is formed on the pixel electrode 191 and the insulating layer 180c. The first alignment layer 11 includes a photoreactive material.

In the present exemplary embodiment, the first alignment layer 11 includes the photoalignment layer according to the aforementioned exemplary embodiment of the present invention.

Herein, a method of forming the alignment layer will be described.

A photoalignment agent according to an exemplary embodiment of the present invention is coated on the pixel electrode 191, and the coated photoalignment agent is baked. The baking may be performed by two steps of pre-baking and hard-baking. In the hard-baking, the polyamic acid included in the photoalignment agent may be converted into a polyimide, and the flexible cross-linking agent may be esterified to be bonded to the polyimide in a range of 150° C. to 200° C.

Thereafter, the first alignment layer 11 may be formed by irradiating polarized light to the photoalignment agent. In this case, the irradiated light may be ultraviolet light having a wavelength range of 240 nanometers to 380 nanometers. Preferably, the ultraviolet light with a wavelength of 254 nanometers may be used. The polarized light may have energy in a range of 0.20 J/cm$^2$ to 1.0 J/cm$^2$. For example, the polarized light may have energy in a range of 0.40 J/cm$^2$ to 0.50 J/cm$^2$.

In order to increase an alignment property, the first alignment layer 11 may be baked once more. In this case, the photo-decomposed molecules may be rearranged to increase the anisotropy.

Next, the upper display panel 200 will be described.

A light blocking member 220 is formed on a second substrate 210 made of transparent glass or plastic. The light blocking member 220 is called a black matrix and blocks light leakage.

A plurality of color filters 230 are formed on the second substrate 210. In the case where the second passivation layer 180b of the lower display panel 100 is a color filter or where a color filter is formed on the lower display panel 100, the color filter 230 of the upper display panel 200 may be omitted. Further, the light blocking member 220 of the upper display panel 200 may also be formed on the lower display panel 100.

An overcoat 250 is formed on the color filter 230 and the light blocking member 220. The overcoat 250 may be made of an (organic) insulating material, prevents the color filter 230 from being exposed, and provides a flat surface. The overcoat 250 may be omitted.

A second alignment layer 21 is formed on the overcoat 250. The second alignment layer 21 may be formed by the same material and the same method as the first alignment layer 11 described above.

In the present exemplary embodiment, the liquid crystal layer 3 may include a liquid crystal material having negative or positive dielectric anisotropy.

The liquid crystal molecules of the liquid crystal layer 3 are aligned so that long axes thereof are parallel to the panels 100 and 200.

The pixel electrode 191 receives a data voltage from the drain electrode 175, and the common electrode 270 receives a common voltage having a predetermined magnitude from a common voltage applying unit disposed outside of the display area.

The pixel electrode 191 and the common electrode 270 serving as field-generating electrodes generate an electric field, and thus the liquid crystal molecules of the liquid crystal layer 3 positioned on the two field-generating electrodes 191 and 270 may rotate in a direction parallel to the electric field. Polarization of light passing through the liquid crystal layer varies according to the rotation directions of the liquid crystal molecules determined as described above.

As such, the two field generating electrodes 191 and 270 are formed on one display panel 100, thereby increasing transmittance of the liquid crystal display device and implementing a wide viewing angle.

In the liquid crystal display device according to the illustrated exemplary embodiment, the common electrode 270 has a planar shape, and the pixel electrode 191 has a plurality of branch electrodes, but in a liquid crystal display device according to another exemplary embodiment of the present invention, the pixel electrode 191 may have a planar shape, and the common electrode 270 may have a plurality of branch electrodes.

The present invention may be applied to all other cases where the two field generating electrodes are overlapped with each other on the first substrate 110 with an insulating layer therebetween, the first field generating electrode formed below the insulating layer has a planar shape, and the second field generating electrode formed on the insulating layer has a plurality of branch electrodes.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A photoalignment agent, comprising:
   (a) a copolymer formed from at least one compound of cyclobutanedianhydride (CBDA) and a cyclobutanedianhydride derivative, and a first diamine including alkylene group, $-C_kH_{2k}-$, wherein k is a positive integer; and
   (b) a cross-linking agent including an alkylene group, $-C_nH_{2n}-$, wherein n is a positive integer,
   wherein the cross-linking agent includes at least one of compounds that are respectively represented by Chemical Formula 1, Chemical Formula 2, and Chemical Formula 3:

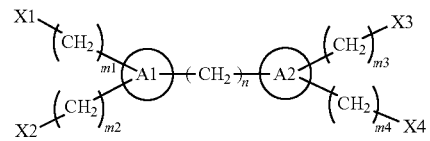

Chemical Formula 1

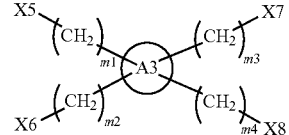

Chemical Formula 2

Chemical Formula 3 wherein n indicates a positive integer in a range of 3 to 11; each of m1 to m4 of Chemical Formula 1 independently indicates a positive integer in a range of 2 to 4; each of m1 to m4 of Chemical Formula 2 independently indicates a positive integer in a range of 2 to 4; each of m1 to m2 of Chemical Formula 3 independently indicates a positive integer in a range of 2 to 4; A1 and A2 independently indicate

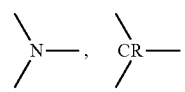

wherein R is H or an alkyl group with a carbon number of 1 to 3, an aromatic compound with a carbon number of 6 to 30, or an aliphatic cyclic compound with a carbon number of 4 to 20; A3 is

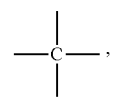

an aromatic compound with a carbon number 6 to 30, or an aliphatic cyclic compound with a carbon number of 4 to 20; A4 is a single bond, $-CH_2-$, $-COO-$, $-OCO-$, $-S-$, $-O-$, an aromatic compound with a carbon number of 6 to 30, or an aliphatic cyclic compound with a carbon number of 4 to 20; and each of X1, X2, X3, X4, X5, X6, X7, and X8 independently indicates $-OH$, $-NH_2$, an aryl group, a vinyl group, or

and

X9 and X10 independently indicate $-NH_2$, an aryl group, a vinyl group, or

2. The photoalignment agent of claim 1, wherein the first diamine includes a compound that is represented by Chemical Formula 4:

Chemical Formula 4

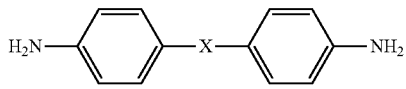

wherein, X indicates —(CH2)$_h$—, —S—(CH2)$_h$—S—, —O—(CH2)$_h$—O—,

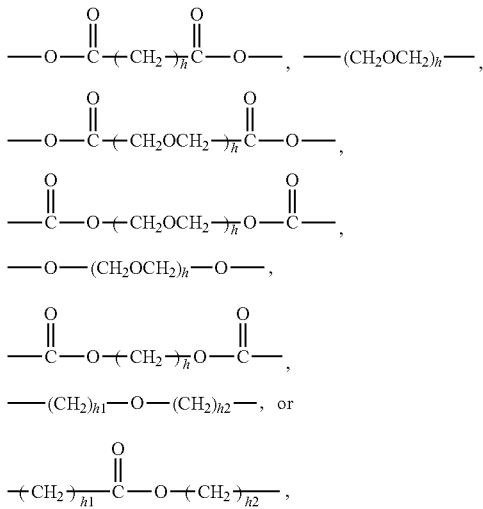

h indicates a natural number in a range of 1 to 10, and h1 and h2 indicate positive integers that are selected to obtain a range of 2 to 10 as a sum of carbon numbers of the alkylene group of X.

3. The photoalignment agent of claim 1, wherein the copolymer further includes a polymer formed from at least one of cyclobutanedianhydride and a cyclobutanedianhydride derivative; and a polymer of a second diamine that is represented by Chemical Formula 5:

Chemical Formula 5

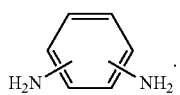

4. The photoalignment agent of claim 1, wherein the cyclobutanedianhydride includes a compound that is represented by Chemical Formula 6, and the cyclobutanedianhydride derivative includes a compound that is represented by Chemical Formula 7:

Chemical Formula 6

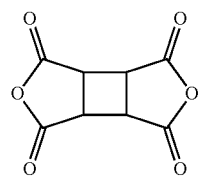

Chemical Formula 7

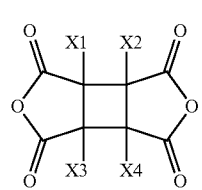

wherein, X1, X2, X3, and X4 independently indicate hydrogen, a halogen, or an alkyl group, and at least one of X1, X2, X3, and X4 does not indicate hydrogen.

5. The photoalignment agent of claim 1, wherein the copolymer includes polyamic acid.

6. The photoalignment agent of claim 1, further comprising:
at least one solvent of N-methyl-2-pyrolidone (NMP) and 2-butyl cellosolve.

7. A liquid crystal display device, comprising:
a first substrate;
a thin film transistor disposed on the first substrate;
a first electrode connected to the thin film transistor; and
a first alignment layer disposed on the first electrode,
wherein the first alignment layer includes:
    a copolymer formed from at least one compound of cyclobutanedianhydride (CBDA) and a cyclobutanedianhydride derivative, and a first diamine including alkylene group —C$_k$H$_{2k-}$, k is a positive integer;
    and a cross-linking agent including an alkylene group —C$_n$H$_{2n-}$, n is a positive integer,
    wherein the copolymer includes polyimide
    wherein the cross-linking agent includes at least one of compounds that are respectively represented by Chemical Formula 1, Chemical Formula 2, and Chemical Formula 3:

Chemical Formula 1

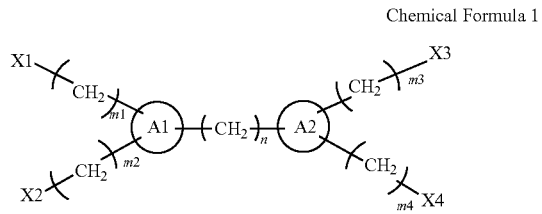

Chemical Formula 2

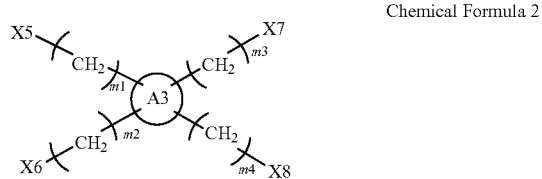

Chemical Formula 3

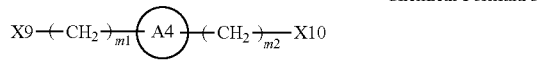

wherein n indicates a positive integer in a range of 3 to 11;
each of m1 to m4 of Chemical Formula 1 independently indicates a positive integer in a range of 2 to 4; each of m1 to m4 of Chemical Formula 2 independently indicates a positive integer in a range of 2 to 4; each of m1 to m2 of Chemical Formula 3 independently indicates a positive integer in a range of 2 to 4; A1 and A2 independently indicate

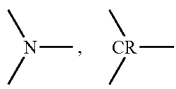

wherein R is H or an alkyl group with a carbon number of 1 to 3, an aromatic compound with a carbon number of 6 to 30, or an aliphatic cyclic compound with a carbon number of 4 to 20; A3 is

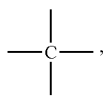

an aromatic compound with a carbon number of 6 to 30, or an aliphatic cyclic compound with a carbon number of 4 to 20; A4 is a single bond, —CH$_2$—, —COO—, —OCO—, —S—, —O—, an aromatic compound with a carbon number of 6 to 30, or an aliphatic cyclic compound with a carbon number of 4 to 20; and each of X1, X2, X3, X4, X5, X6, X7, and X8 independently indicates —OH, —NH$_2$, an aryl group, a vinyl group, or

and
X9 and X10 independently indicate —NH$_2$, an aryl group, a vinyl group, or

8. The liquid crystal display device of claim 7, wherein the first diamine includes a compound that is represented by Chemical Formula 4:

Chemical Formula 4

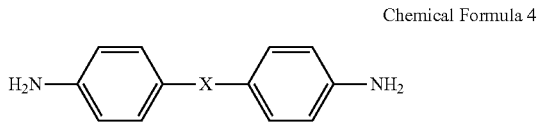

wherein, X indicates —(CH$_2$)$_h$—, —S—(CH$_2$)$_h$—S—, —O—(CH$_2$)$_h$—O—,

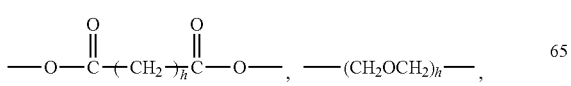, —(CH$_2$OCH$_2$)$_h$—,

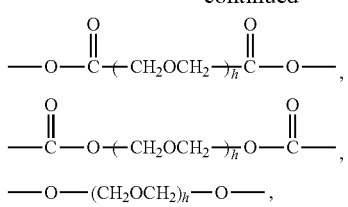

—O—(CH$_2$OCH$_2$)$_h$—O—,

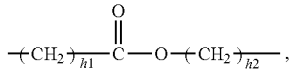

—(CH$_2$)$_{h1}$—O—(CH$_2$)$_{h2}$—, or

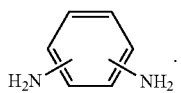

h indicates a positive integer in a range of 1 to 10, and h1 and h2 indicate positive integer that are selected to obtain a range of 2 to 10 as a sum of carbon numbers of the alkylene group of X.

9. The liquid crystal display device of claim 7, wherein the copolymer further includes a polymer formed from at least one of cyclobutanedianhydride and a cyclobutanedianhydride derivative; and a polymer of a second diamine that is represented by Chemical Formula 5:

Chemical Formula 5

H$_2$N—⌬—NH$_2$

10. The liquid crystal display device of claim 7, wherein the polymer included in the photoalignment layer includes at least one of repeated units that are respectively represented by Chemical Formula 8, Chemical Formula 9, Chemical Formula 10, and Chemical Formula 11:

Chemical Formula 8

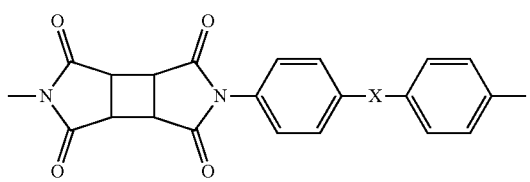

Chemical Formula 9

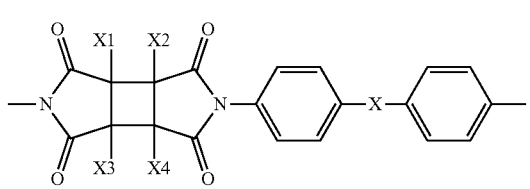

Chemical Formula 10

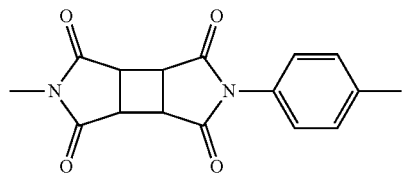

Chemical Formula 11

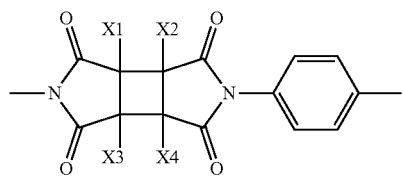

wherein, X indicates —(CH$_2$)$_h$—, —S—(CH$_2$)$_h$—S—, —O—(CH$_2$)$_h$—O—,

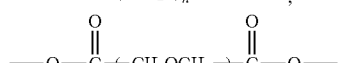

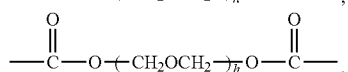

—O—(CH$_2$OCH$_2$)$_h$—O—,

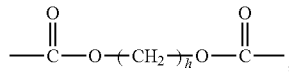

—(CH$_2$)$_{h1}$—O—(CH$_2$)$_{h2}$—, or

h indicates a positive integer in a range of 1 to 10, and h1 and h2 indicate positive integer that are selected to obtain 10 as a sum of carbon numbers of the alkylene group of X, and in Chemical Formula 9 and Chemical Formula 11, X1, X2, X3, and X4 independently indicate hydrogen, a halogen, or an alkyl group, and at least one of X1, X2, X3, and X4 does not indicate hydrogen.

11. The liquid crystal display device of claim 7, wherein the copolymer includes a compound that is represented by Chemical Formula 12:

wherein, X indicates —(CH$_2$)$_h$—, —S—(CH$_2$)$_h$—S—, —O—(CH$_2$)$_h$—O—,

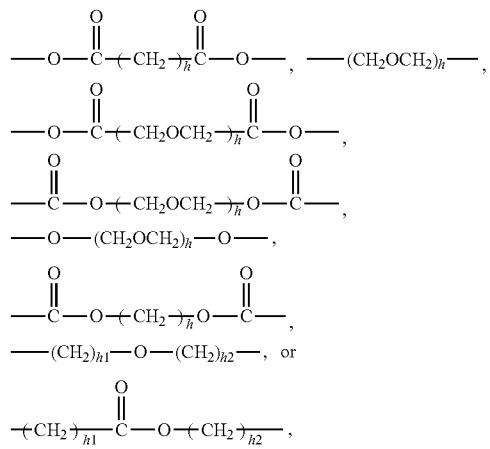

—(CH$_2$)$_{h1}$—O—(CH$_2$)$_{h2}$—, or h indicates a positive integer in a range of 1 to 10, h1 and h2 indicate positive integer that are selected to obtain 10 as a sum of carbon numbers of the alkylene group of X, a:b indicates 20:80 to 50:50, X1, X2, X3, and X4 independently indicate hydrogen, a halogen, or an alkyl group, and at least one of X1, X2, X3, and X4 does not indicate hydrogen.

12. The liquid crystal display device of claim 7, further comprising:

a second electrode disposed on the first substrate, wherein an insulating layer is disposed between the first electrode and the second electrode.

13. The liquid crystal display device of claim 12, wherein the first electrode includes a plurality of branch electrodes, and the second electrode has a planar shape.

14. The liquid crystal display device of claim 13, wherein the branch electrodes are overlapped with the second electrode having the planar shape.

15. The liquid crystal display device of claim 12, further comprising:

a passivation layer positioned between the thin film transistor and the second electrode, wherein the thin film transistor and the first electrode are connected to each other through a contact hole passing through the passivation layer and the insulating layer.

16. The liquid crystal display device of claim 12, further comprising:

a second substrate facing the first substrate;

a second alignment layer positioned on the second substrate; and

Chemical Formula 12

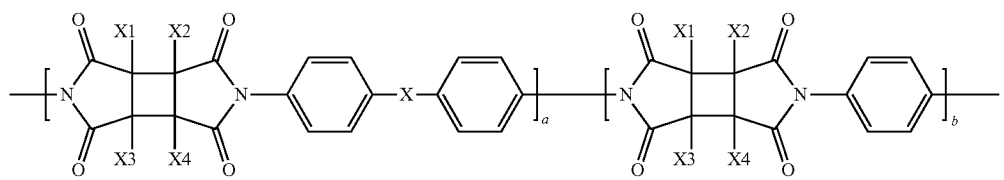

a liquid crystal layer positioned between the first substrate and the second substrate and including a liquid crystal molecule, wherein the second alignment layer is formed of the same material as the first alignment layer.

* * * * *